US007471946B2

(12) United States Patent  
Adamczyk et al.

(10) Patent No.: US 7,471,946 B2  
(45) Date of Patent: Dec. 30, 2008

(54) METHODS OF PROVIDING MESSAGES USING LOCATION CRITERIA AND RELATED SYSTEMS

(75) Inventors: Maria Adamczyk, Alpharetta, GA (US); Edward Michael Silver, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 1276 days.

(21) Appl. No.: 10/606,675

(22) Filed: Jun. 27, 2003

(65) Prior Publication Data

US 2004/0266398 A1  Dec. 30, 2004

(51) Int. Cl.
*H04Q 7/00* (2006.01)
*H04Q 7/20* (2006.01)

(52) U.S. Cl. .............. 455/412.1; 455/412.2; 455/418; 455/456.3; 455/456.5; 455/461; 455/552.1; 379/88.12; 379/88.17; 379/88.23

(58) Field of Classification Search .............. 455/412.1, 455/412.2, 414.1, 414.2, 456.1, 456.3, 466, 455/418, 456.5, 461, 552.1; 709/203; 11/206; 379/88.22, 88.23, 88.25, 88.12, 88.17
See application file for complete search history.

(56) References Cited

U.S. PATENT DOCUMENTS 5,793,859 A * 8/1998 Matthews .............. 379/211.03
5,933,778 A * 8/1999 Buhrmann et al. .......... 455/461
6,035,104 A * 3/2000 Zahariev ..................... 709/203
7,006,609 B2 * 2/2006 Cloutier et al. .......... 379/88.23
2002/0035605 A1 * 3/2002 McDowell et al. .......... 709/206
2003/0028524 A1 * 2/2003 Keskar et al. .................. 707/3
2004/0111477 A1 * 6/2004 Boss et al. .................. 709/206
2007/0232261 A1 * 10/2007 Spector .................... 455/404.2

OTHER PUBLICATIONS

Cellocate Beacon Network, Introductory Information, Version 1.6 Feb. 2002 pp. 1-13.
"An Introduction to SnapTrack™ Server-Aided GPS Technology", www.snaptrack.com/ at work/ion.pdf.
Glenn Letham, Natural Area Coding System Extended to Mobile Location Based Services Network (MLBS.NET), Jun. 20, 2003, pp. 1-5, http://www.wirelessdevnet.com/articles/mlbsnet/index2_html.

* cited by examiner

*Primary Examiner*—Binh K. Tieu
(74) *Attorney, Agent, or Firm*—Myers, Bigel, Sibley & Sajovec, P.A.

(57) ABSTRACT

Methods of providing messages for a user can include accepting entry of a message for the user, and accepting entry of a location criteria associated with the message. Physical location information for a wireless communications device associated with the user can be obtained, and the message for the user can be transmitted when the physical location information for the wireless communications device matches the location criteria associated with the message. Related systems are also discussed.

54 Claims, 2 Drawing Sheets

METHODS OF PROVIDING MESSAGES USING LOCATION CRITERIA AND RELATED SYSTEMS

FIELD OF THE INVENTION

The present invention relates to communications in general and more particularly to messaging services.

BACKGROUND OF THE INVENTION

Messaging and reminder functionalities may be provided by different services and/or devices. Personal computers and personal digital assistants often provide calendar and/or task functions that provide messages and/or reminders of scheduled appointments and/or tasks. Moreover, voicemail services may also provide voicemail messages in the subscriber's voicemail box for appointments scheduled in an electronic calendar.

SUMMARY

According to embodiments of the present invention, methods of providing messages for a user can include accepting entry of a message for the user, and accepting entry of a location criteria associated with the message. Physical location information for a wireless communications device associated with the user can be obtained, and the message for the user can be transmitted when the physical location information for the wireless communications device matches the location criteria associated with the message.

The location criteria may identify a physical address. More particularly, the location criteria may identify one of a plurality of physical addresses associated with the user, and the plurality of physical addresses associated with the user may include a first physical address for a residence of the user and a second physical address for a workplace of the user.

In addition, entry of a second message for the user can be accepted, and entry of a second location criteria associated with the second message can be accepted wherein the second location criteria is different than the first location criteria. The second message for the user can be transmitted when the physical location information for the wireless communications device matches the second location criteria associated with the second message.

Moreover, obtaining physical location information for the wireless communications device associated with the user may include polling for the physical location information. In an alternative, obtaining physical location information for the wireless communications device associated with the user may include accepting physical location information. For example, the physical location information can be provided responsive to movement of the wireless communications device, or the physical location information can be provided periodically from a database of mobile terminals and locations.

Transmitting the message for the user may include transmitting the message to the wireless communications device. In an alternative, transmitting the message for the user may include transmitting the message to an electronic device other than the wireless communications device at a location identified by the physical location information. In addition, after transmitting the message to the other electronic device, receipt of confirmation from the other electronic device can be awaited for a predetermined period of time, and after exceeding the predetermined period of time without receiving confirmation from the other electronic device, the message can be retransmitted to the wireless communications device.

Entry of a time criteria associated with the message for the user can be accepted, and transmitting the message for the user may include transmitting the message for the user when both the physical location information for the wireless communications device matches the location criteria associated with the message and the time matches the time criteria associated with the message for the user. Moreover, the time criteria may include a date.

In addition, accepting entry of a deadline criteria associated with the message for the user can be accepted, and the message for the user can be transmitted when the deadline criteria has been satisfied even though the location criteria has not been satisfied. More particularly, the deadline criteria may include a date and a time.

According to additional embodiments of the present invention, a messaging system may include a data input system that accepts entry of a message for a user, that accepts entry of a location criteria associated with the message, and that obtains physical location information for a wireless communications device associated with the user. The messaging system may also include a transmitter that transmits the message for the user when the physical location information for the wireless communications device matches the location criteria associated with the message.

According to yet additional embodiments of the present invention, a messaging system may include means for accepting entry of a message for a user, and means for accepting entry of a location criteria associated with the message. In addition, means may be provided for obtaining physical location information for a wireless communications device associated with the user and for transmitting the message for the user when the physical location information for the wireless communications device matches the location criteria associated with the message.

DETAILED DESCRIPTION

Figure 1:
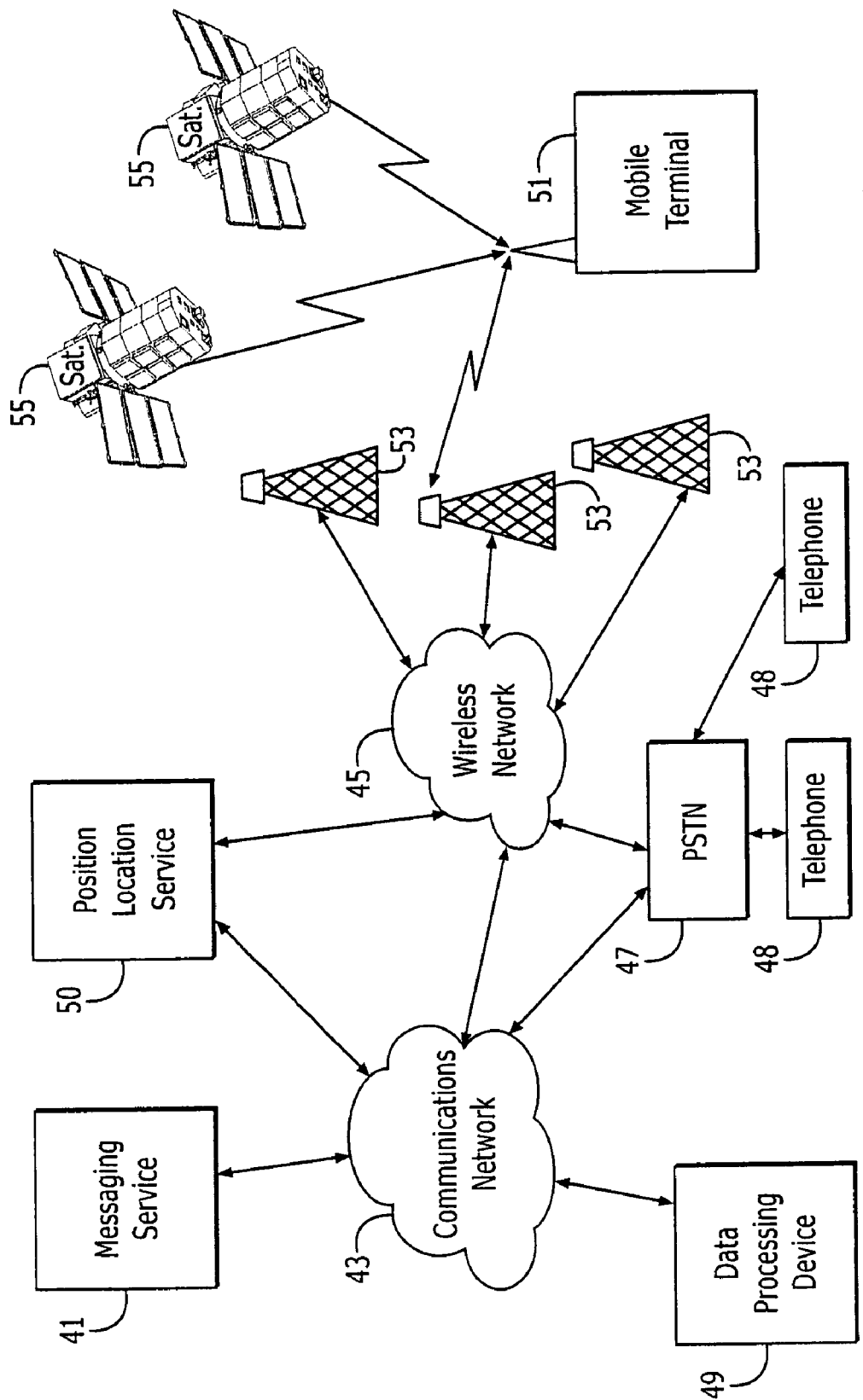
FIG. 1 is a block diagram of communications systems including messaging services according to embodiments of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

According to embodiments of the present invention, a mobile terminal may provide wireless communications through a wireless communications network. The mobile terminal, for example, may be a radiotelephone, a personal wirelessly enabled digital assistant (such as Palm Pilot™ or a Pocket PC™), a pager, a wireless messaging device (such as a Blackberry™ wireless handheld device), a wireless enabled laptop computer, and/or combinations thereof. Moreover, the mobile terminal may provide wireless communications through wireless communications networks such as WiFi networks, cellular networks, Personal Communications Services (PCS) networks, satellite communications networks, ultrawideband networks, and/or Bluetooth networks, for example. The mobile terminal can also include a positioning system such as a global positioning system (GPS) or other known positioning functionalities. Positioning systems are described, for example, in the references "Cellocate Beacon™ Network" (Cell-Loc Inc., Copyright 2002, February 2002, pages 1-12) and "An Introduction To Snap Track™ Server-Aided GPS Technology". The disclosures of both of these references are incorporated herein in their entirety by reference.

The mobile terminal can thus receive transmissions from which physical location information identifying its physical location can be derived, and this physical location information can be provided to the wireless communications network. A position location service included within and/or coupled to the wireless communications network can thus track a current location of the mobile terminal. Moreover, a messaging service can be coupled (directly or indirectly) with the position location service, and the messaging service can condition delivery of messages on physical location information obtained from the position location service. In an alternative, the position location service may be implemented as a part of the messaging service. A location of a user of the mobile terminal can be assumed to be the same as that of a designated mobile terminal, and the location of the mobile terminal can be used as a condition to transmit messages from the messaging service.

As shown in FIG. 1, a messaging service 41 according to embodiments of the present invention may be used in combination with a communications network 43 (such as the internet), a position location service 50, a wireless communications network 45 (such as a WiFi network, a cellular network, a Personal Communications Services (PCS) network, a satellite communications network, a ultrawideband network, and/or a Bluetooth network), a public switched telephone network (PSTN) 47 (such as a circuit-switched network, a packet-switched network, and/or a Voice over Internet Protocol network) providing service for a plurality of telephones 48, and/or a data processing device 49 (such as a personal computer). A mobile terminal 51, for example, may provide wireless communications with the wireless communications network 43 through a plurality of base stations 53. Moreover, the mobile terminal 51 may be able to derive physical location information identifying its location using signals received from one or a plurality of positioning satellites 55 (such as global positioning system (GPS) satellites). Each of the messaging service 41 and/or the position location service 50 may be implemented as one or more servers. Moreover, the messaging service and the position location service may be implemented on a common server or servers.

The messaging service 41 can accept entry of messages (such as reminders) for a user together with location criteria associated with each message. The messaging service 41 can also accept other criteria, such as time criteria associated with a message. By way of example, a message may be a task reminder that should be provided to the user when the user gets to the office on a particular date. Stated in other words, the message can be a task reminder, the location criteria can be a location (the office) where the message should be received, and the time criteria can be a date on which the message should be delivered. The message, location criteria, and time criteria can be entered into the messaging service 41 over the communications network 43 using a data processing device 49 such as a personal computer, a telephone 48, a mobile terminal 51, and/or other communications devices. According to particular embodiments, the messaging service 41 may provide a web based user interface and/or form for entry of messages and associated location and/or time criteria.

The mobile terminal 51 may provide data communications with the wireless network 45 through a plurality of base stations 53, and the mobile terminal 51 may also include a positioning system to facilitate determining a location of the mobile terminal. For example, the mobile terminal may include a receiver that receives positioning signals from a plurality of positioning satellites 55 such as global positioning system (GPS) satellites. In an alternative, the mobile terminal may derive positioning information using transmissions received from one or a plurality of base stations 53. Accordingly, the mobile terminal can receive information allowing a determination of a location of the mobile terminal. The received information can be processed at the mobile terminal 51 and transmitted to the position location service 50 through a base station 53 and the wireless network 45. In an alternative, the positioning transmissions received at the mobile terminal can be forwarded by the mobile terminal 51 with little or no processing at the mobile terminal for processing at the wireless network 45 and/or the position location service 50.

In any event, the position location service 50 can maintain a database of locations of mobile terminals 51. Position location, for example, is being developed for "911" emergency services calls (such as police, fire department, and/or ambulance dispatching call) so that a call for emergency service will automatically provide a location of the mobile terminal making the call for emergency service. According to embodiments of the present invention, a database of mobile terminal locations from a position location service can be used by a messaging service to determine when to send messages for a user of a mobile terminal. Moreover, positioning determinations similar to those provided for "911" emergency calls may be used by the position location service 50 according to embodiments of the present invention.

The location of a mobile terminal stored at the position location service 50 can be updated at regular intervals or when a change in location of the mobile terminal 51 is detected. For example, the position location service 50 may request updated information/transmissions from the mobile terminal 51 at regular intervals, and/or the mobile terminal 51 may provide updated information/transmissions to the position location service 50 at regular intervals without request from the position location service 50. In an alternative, the mobile terminal 51 may provide updated information/transmissions when a change of location is determined. In addition or in an alternative, the location of a mobile terminal stored at the position location service 50 may be updated when a conventional communication (such as a radiotelephone call, e-mail transmission, text message transmission, or other transmission) is established between the mobile terminal 51 and the communications network 45 and/or when the mobile terminal 51 moves from a first cell covered by a first base station 53 to a second cell covered by a second base station 53.

While the position location service 50 is illustrated as a functional block separate from the wireless network 45 and the messaging service 41, functionality of the position location service may be incorporated in the wireless network 45, the communications network 43, and/or the messaging service 41. Similarly, functionality of the messaging service 41 may be incorporated in the communications network 43, the position location service 50, and/or the wireless network 45. Moreover, while the messaging service 41 and the position location service 50 are shown coupled through the communications network 43, a direct coupling could be provided between the messaging service 41 and the position location service 50. Moreover, the position location service can be maintained as a part of a "911" emergency services call system that provides a location of a mobile terminal during an emergency services call.

As discussed above, location techniques have been developed to determine a location of a mobile terminal making a "911" emergency services call. These (and other) location techniques can be used by the position location service to maintain a database of locations for subscribing mobile terminals. While location techniques for "911" emergency calls may be used to determine a location of a mobile terminal only when placing a "911" emergency call, these (and/or other) techniques can be used to determine mobile terminal locations in an expanded set of circumstances. For example, mobile terminal locations may be determined according to embodiments of the present invention at predetermined time intervals, when any communication is established between the mobile terminal and the wireless network, when the mobile terminal detects a change in its position, and/or when the mobile terminal detects a change in service from one base station to another.

The user of the mobile terminal 51 may enter messages and related messaging criteria into the messaging service 41 using a data processing device 49 such as a personal computer to provide a web based user interface. The messaging criteria may include a location criteria such as an address. For example, the user may enter an address of his home or office, and the messaging service can determine when physical location information obtained from the position location service matches the address provided as a location criteria. Accordingly, some messages may be transmitted only when the mobile terminal is at the home address, and other messages may be transmitted only when the mobile terminal is at the office address. The location criteria may be further defined so that the message is transmitted when initially reaching the location, some predetermined time after reaching the location, repeatedly while at the location, and/or on leaving the location.

More particularly, the user may define a plurality of significant locations such as an office, a home, and/or any other location that the user may frequent. For example, the user may identify locations with names such as home or office, and then provide additional information for each location such as an address, GPS coordinates, or any other information that would allow the messaging service to identify the location from information provided by the position location service. Once the information for a particular location has been provided to the messaging service 41, the user need only identify the name of the location when providing the location criteria for a message.

The messaging criteria may also include a time criteria such as a date and/or a time, and/or an identification of a device to which the message should be transmitted. For example, the default can be that the message is transmitted to the mobile terminal used to determine the user's location. The messaging service may also allow entry of alternative messaging devices such that the user may identify other devices at the location satisfying the location criteria to which the message should be sent. For example, the user may provide the address of an office as the location criteria of a message, the user may provide a particular date as time criteria, and the user may define a personal computer at the office as a messaging device. Accordingly, the message can be transmitted to the personal computer on the date satisfying the time criteria when the user enters the office with the mobile terminal. Without a time criteria, the message may be transmitted as soon as the location criteria is satisfied.

Upon satisfying criteria for a message to be transmitted for a user, the message can be transmitted to the mobile terminal 51 being used by the user. For example, the mobile terminal 51 may be a cellular radiotelephone carried by the user, and the location of the mobile terminal will thus coincide with the location of the user. The user, however, may have more than one mobile terminal that can be used to track the location of the user at the position location service 50. For example, the user may have a cellular radiotelephone, a wireless personal digital assistant, and/or a Wi-Fi enabled (according to the IEEE 802.11 standard) laptop computer so that the position location service may include physical location information for each of the different mobile terminals. Accordingly, the location criteria for a message may include both a location and an identification of the particular mobile terminal from which the location should be determined. Different messages for the same user may identify different mobile terminals from which location should be determined. In an alternative, a user may globally identify a mobile terminal from which the location is used for all messages for that user, and the mobile terminal identification may be globally changed for all messages.

Once the criteria for a message has been satisfied, the message can be transmitted by the messaging service 41 to the specified device. As discussed above, the default may be that the message is transmitted to the mobile terminal from which locations are determined. For example, the mobile terminal may be a cellular radiotelephone with GPS capability, and the message may be transmitted as a short message service (SMS) text message.

In an alternative, the message may be transmitted to another device such as a wire line telephone or a personal computer at the location satisfying the location criteria. If transmitting to a personal computer, the message may be transmitted over a data network (such as the internet) as an e-mail. When transmitting to a wire line telephone, the message may be transmitted over a public switched telephone network (PSTN) as a voice mail.

Figure 2:
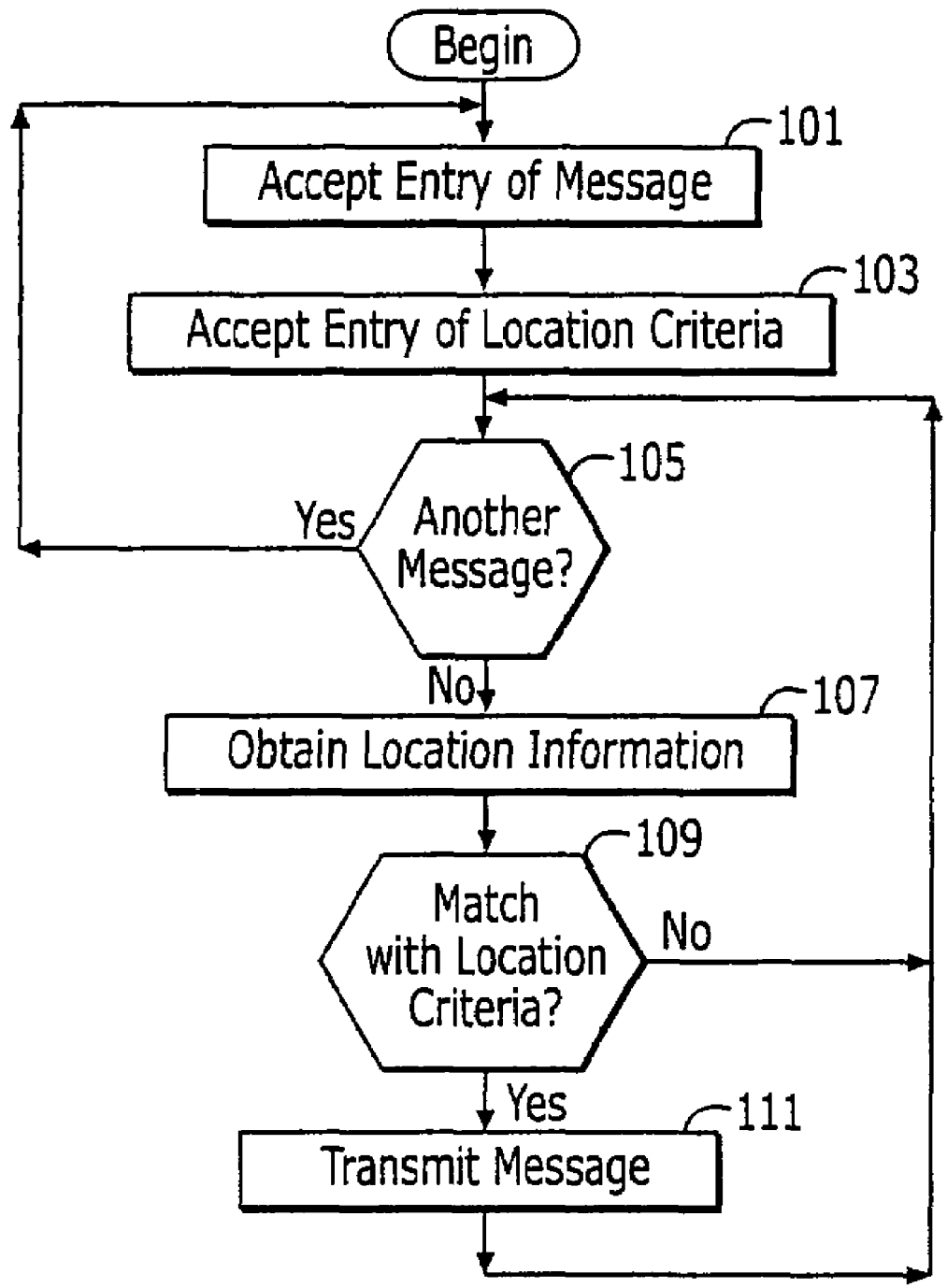
FIG. 2 is a flow chart illustrating operations of providing messages according to embodiments of the present invention.

Methods of providing messages according to additional embodiments of the present invention are illustrated in FIG. 2. In particular, entry of a message can be accepted at block 101, and entry of location criteria associated with the message can be accepted at block 103. The message, for example, can be a task reminder in a text message format. In an alternative, the message can be provided verbally over a wired or wireless telephone and transcribed either manually or automatically.

At block 103, the location criteria associated with the message may define a location of a mobile terminal carried by the user that triggers transmission of the message. By associating a location criteria with a message, the message can be transmitted, for example, when the user carries the mobile terminal to the office. When accepting entry of a location criteria, additional criteria, such as time criteria, can also be accepted for a message. By associating a location criteria such as the office and a time criteria such as a date with the message, the message may be transmitted when the user carries the mobile terminal to the office on the specified date. Moreover, the location criteria may be specified such that transmission of the message is triggered on a change in location such as, for example, entering an office or leaving an office.

A profile for the user at a messaging service center, for example, may include names of a plurality of locations associated with the user such as home, office, and any other location specified by the user. More particularly, each named location may have a corresponding profile identifying the location sufficiently to allow matching with physical location information obtained for a wireless device. For example, the profile for a location may include an address and/or GPS coordinates for the location. Accordingly, once a name and a profile have been entered for a location, the user need only enter the location name as the location criteria for a message.

At block 105, it can be determined if there is another message to be accepted. If there is an additional message being entered, blocks 101 and 103 can be repeated. The message and the location criteria, for example, can be entered by a user through a personal computer coupled to a messaging service through a communications network such as the internet, through a mobile terminal coupled to the messaging service through a wireless network, and/or through a telephone coupled to the messaging service through a public switched telephone network. Upon entry by the user, the message and location criteria can be accepted by the messaging service. A single user session may include entry of a plurality of messages and associated location criteria, and acceptance of messages and associated location criteria can be repeated at blocks 101, 103, and 105 until all messages in a session have been entered.

Physical location information for the user's mobile terminal can be obtained at block 107. For example, the user may designate a particular mobile terminal for which physical location information should be obtained and compared with the location criteria associated with messages. For example, the designated mobile terminal may include positioning functionality used to derive physical location information for the mobile terminal, and the physical location information for the mobile terminal may be compared with the location criteria of the messages for the user. If a match occurs between the physical location information for the mobile terminal and the location criteria associated with one of the messages at block 109, the message can be transmitted at block 111. The physical location information for the user's mobile terminal may be obtained, for example, from periodic transmissions originated at the mobile terminal; by polling the mobile terminal for physical location information; and/or from the mobile terminal on movement of the mobile terminal. If an additional criteria, such as a time criteria, is associated with a message, transmission of the message may require satisfaction of both criteria.

The message may be transmitted at block 111 to the mobile terminal for which the matching physical location information was obtained. In an alternative, the message may be transmitted at block 111 to another communications device at the identified location of the mobile terminal. For example, the location criteria for the message may be the user's office such that a match between the location criteria and the location of the mobile terminal occurs at block 109 when the mobile terminal is carried into the user's office, and the message may be transmitted at block 111 to a personal computer in the user's office. Once the message is transmitted at block 111 or if there is not a match at block 109, it can be determined if another message should be accepted at block 105, and additional physical location information for the mobile terminal can be obtained at block 107.

Moreover, obtaining physical location information at block 107 for the mobile terminal, may including periodically polling for physical location information. In other alternatives, the mobile terminal may initiate periodic location updates, updates may be initiated responsive to movement of the mobile terminal, or updates may be initiated during communications between the mobile terminal and a wireless network. Moreover, the most current locations of subscribing mobile terminals may be maintained, for example, in a database at a messaging service performing messaging operations, at a position location service separate from the messaging service, or at a wireless communications network.

According to additional embodiments of the present invention, multiple criteria may be associated with a message such that the message is transmitted on satisfaction of one of the criteria. For example, a message may have an associated location criteria and an associated deadline criteria so that the message is transmitted on satisfaction of the location criteria (when the location of the mobile terminal matches that of the location criteria) or on satisfaction of the deadline criteria (when a predetermined time has passed without satisfying the location criteria). For example, a message may have an associated location criteria such as the office and an associated deadline criteria such as a particular time and date. The message can thus be transmitted at the particular time and date even though the user never made it to the office. Accordingly, the message is not "lost" just because the user's plans changed.

As discussed above, the user may designate a device other than the mobile terminal to receive the message. In the event that another device is designated and the user does not check the other device, embodiments of the present invention may include a confirmation feature. More particularly, when the message is transmitted to a device other than the mobile terminal, the messaging service may require a confirmation of receipt from the user. If no confirmation of receipt is received within a predetermined period of time, the messaging service can retransmit the message to the mobile terminal. For example, the message may be transmitted to a computer at the user's office, but the user may not be present at the office, such as when a deadline criteria for a message is satisfied after the user did not go to the office (designated as the location criteria). Because the user is not at the office, the message cannot be confirmed, and the messaging service can thus transmit the message to the mobile terminal.

Moreover, the messaging service may accept a message in one form and transmit the message in a second form. For example, a message may be accepted in a text form and transmitted in a verbal/voice form using voice generation. In an alternative, a message may be accepted in a verbal/voice form and converted using voice recognition software so that the message can be transmitted in a text format.

Embodiments of the present invention have been described above with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of providing messages for a user, the method comprising:
   accepting entry of a message for the user;
   accepting entry of a location criteria associated with the message;
   obtaining physical location information for a wireless communications device associated with the user wherein the physical location information identifies a physical location of the wireless communications device; and
   transmitting the message for the user when the physical location information for the wireless communications device matches the location criteria associated with the message wherein transmitting the message for the user comprises transmitting the message to an electronic device other than the wireless communications device at a location identified by the physical location information.

2. A method according to claim 1 wherein the location criteria identifies a physical address.

3. A method according to claim 2 wherein the location criteria identifies one of a plurality of physical addresses associated with the user.

4. A method according to claim 1 further comprising:
   accepting entry of a second message for the user;
   accepting entry of a second location criteria associated with the second message wherein the second location criteria is different than the first location criteria; and
   transmitting the second message for the user when the physical location information for the wireless communications device matches the second location criteria associated with the second message.

5. A method according to claim 1 wherein obtaining physical location information for the wireless communications device associated with the user comprises polling for the physical location information.

6. A method according to claim 1 wherein obtaining physical location information for the wireless communications device associated with the user comprises accepting physical location information.

7. A method according to claim 6 wherein the physical location information is provided responsive to movement of the wireless communications device.

8. A method according to claim 6 wherein the physical location information is provided periodically from a database of mobile terminals and locations.

9. A method according to claim 1 wherein transmitting the message for the user comprises transmitting the message to the wireless communications device.

10. A method according to claim 1 further comprising:
    after transmitting the message to the other electronic device, awaiting receipt of confirmation from the other electronic device for a predetermined period of time; and
    after exceeding the predetermined period of time without receiving confirmation from the other electronic device, retransmitting the message to the wireless communications device.

11. A method according to claim 1 further comprising:
    accepting entry of a time criteria associated with the message for the user;
    wherein transmitting the message for the user comprises transmitting the message for the user when both the physical location information for the wireless communications device matches the location criteria associated with the message and the time matches the time criteria associated with the message for the user.

12. A method according to claim 11 wherein the time criteria comprises a date.

13. A method according to claim 1 further comprising:
    accepting entry of a deadline criteria associated with the message for the user; and
    transmitting the message for the user when the deadline criteria has been satisfied even though the location criteria has not been satisfied.

14. A method according to claim 13 wherein the deadline criteria comprises a date and a time.

15. A method according to claim 1 wherein the location criteria defines a location where the message should be received.

16. A method according to claim 1 wherein the wireless communications device is co-located with the user.

17. A method of providing messages for a user, the method comprising:
    accepting entry of a message for the user;
    accepting entry of a location criteria associated with the message;
    obtaining physical location information for a wireless communications device associated with the user wherein the physical location information identifies a physical location of the wireless communications device; and
    transmitting the message for the user when the physical location information for the wireless communications device matches the location criteria associated with the message, wherein the location criteria identifies a physical address, wherein the location criteria identifies one of a plurality of physical addresses associated with the user, and wherein the plurality of physical addresses associated with the user comprises a first address for a residence of the user and a second address for a workplace of the user.

18. A method according to claim 17 wherein transmitting the message for the user comprises transmitting the message to an electronic device other than the wireless communications device at a location identified by the physical location information.

19. A messaging service system comprising:
a data input system that accepts entry of a message for a user, that accepts entry of a location criteria associated with the message, and that obtains physical location information for a wireless communications device associated xvith the user wherein the physical location information identifies a physical location of the wireless communications device; and
a transmitter that transmits the message for the user when the physical location information for the wireless communications device matches the location criteria associated with the message wherein the transmitter transmits the message for the user to an electronic device other than the wireless communications device at a location identified by the physical location information.

20. A system according to claim 19 wherein the location criteria identifies a physical address.

21. A system according to claim 20 wherein the location criteria identifies one of a plurality of physical addresses associated with the user.

22. A system according to claim 19 wherein the data input system further accepts entry of a second message for the user and accepts entry of a second location criteria associated with the second message wherein the second location criteria is different than the first location criteria, and wherein the transmitter transmits the second message for the user when the physical location information for the wireless communications device matches the second location criteria associated with the second message.

23. A system according to claim 19 wherein the data input system obtains physical location information for the wireless communications device associated with the user by polling for the physical location information.

24. A system according to claim 19 wherein the data input system obtains physical location information for the wireless communications device associated with the user by accepting physical location information.

25. A system according to claim 24 wherein the physical location information is provided responsive to movement of the wireless communications device.

26. A system according to claim 24 wherein the physical location information is provided periodically from a database of mobile terminals and locations.

27. A system according to claim 19 wherein the transmitter transmits the message for the user to the wireless communications device.

28. A system according to claim 19 wherein
after transmitting the message to the other electronic device, the transmitter awaits receipt of confirmation from the other electronic device for a predetermined period of time, and wherein after exceeding the predetermined period of time without receiving confirmation from the other electronic device, the transmitter retransmits the message to the wireless communications device.

29. A system according to claim 19 wherein the data input system further accepts entry of a time criteria associated with the message for the user, and wherein transmitter transmits the message for the user when both the physical location information for the wireless communications device matches the location criteria associated with the message and the time matches the time criteria associated with the message for the user.

30. A system according to claim 29 wherein the time criteria comprises a date.

31. A system according to claim 19 wherein the data input system further accepts entry of a deadline criteria associated with the message for the user, and wherein the transmitter transmits the message for the user when the deadline criteria has been satisfied even though the location criteria has not been satisfied.

32. A system according to claim 31 wherein the deadline criteria comprises a date and a time.

33. A system according to claim 19 wherein the location criteria defines a location where the message should be received.

34. A system according to claim 19 wherein the wireless communications device is co-located with the user.

35. A messaging service system comprising:
a data input system that accepts entry of a message for a user, that accepts entry of a location criteria associated with the message, and that obtains physical location information for a wireless communications device associated with the user wherein the physical location information identifies a physical location of the wireless communications device; and
a transmitter that transmits the message for the user when the physical location information for the wireless communications device matches the location criteria associated with the message, wherein the location criteria identifies a physical address, wherein the location criteria identifies one of a plurality of physical addresses associated with the user, and wherein the plurality of physical addresses associated with the user comprises a first physical address for a residence of the user and a second physical address for a workplace of the user.

36. A system according to claim 35 wherein the transmitter transmits the message for the user to an electronic device other than the wireless communications device at a location identified by the physical location information.

37. A messaging system comprising:
means for accepting entry of a message for a user;
means for accepting entry of a location criteria associated with the message;
means for obtaining physical location information for a wireless communications device associated with the user wherein the physical location information identifies a physical location of the wireless communications device; and
means for transmitting the message for the user when the physical location information for the wireless communications device matches the location criteria associated with the message wherein the means for transmitting the message for the user comprises means for transmitting the message to an electronic device other than the wireless communications device at a location identified by the physical location information.

38. A system according to claim 37 wherein the location criteria identifies a physical address.

39. A system according to claim 38 wherein the location criteria identifies one of a plurality of physical addresses associated with the user.

40. A system according to claim 37 further comprising:
means for accepting entry of a second message for the user;
means for accepting entry of a second location criteria associated with the second message wherein the second location criteria is different than the first location criteria; and
means for transmitting the second message for the user when the physical location information for the wireless communications device matches the second location criteria associated with the second message.

41. A system according to claim 37 wherein the means for obtaining physical location information for the wireless communications device associated with the user comprises means for polling for the physical location information.

42. A system according to claim 37 wherein the means for obtaining physical location information for the wireless communications device associated with the user comprises means for accepting physical location information.

43. A system according to claim 42 wherein the physical location information is provided responsive to movement of the wireless communications device.

44. A system according to claim 42 wherein the physical location information is provided periodically from a database of mobile terminals and locations.

45. A system according to claim 37 wherein the means for transmitting the message for the user comprises means for transmitting the message to the wireless communications device.

46. A system according to claim 37 further comprising:
means for retransmitting the message to the wireless communications device after exceeding a predetermined period of time without receiving confirmation from the other electronic device.

47. A system according to claim 37 further comprising:
means for accepting entry of a time criteria associated with the message for the user;
wherein the means for transmitting the message for the user comprises means for transmitting the message for the user when both the physical location information for the wireless communications device matches the location criteria associated with the message and the time matches the time criteria associated with the message for the user.

48. A system according to claim 47 wherein the time criteria comprises a date.

49. A system according to claim 37 further comprising:
means for accepting entry of a deadline criteria associated with the message for the user; and
means for transmitting the message for the user when the deadline criteria has been satisfied even though the location criteria has not been satisfied.

50. A system according to claim 49 wherein the deadline criteria comprises a date and a time.

51. A method according to claim 37 wherein the location criteria defines a location where the message should be received.

52. A system according to claim 37 wherein the wireless communications device is co-located with the user.

53. A messaging system comprising:
means for accepting entry of a message for a user;
means for accepting entry of a location criteria associated with the message;
means for obtaining physical location information for a wireless communications device associated with the user wherein the physical location information identifies a physical location of the wireless communications device; and
means for transmitting the message for the user when the physical location information for the wireless communications device matches the location criteria associated with the message, wherein the location criteria identifies a physical address, wherein the location criteria identifies one of a plurality of physical addresses associated with the user, and wherein the plurality of physical addresses associated with the user comprises a first physical address for a residence of the user and a second physical address for a workplace of the user.

54. A system according to claim 53 wherein the means for transmitting the message for the user comprises means for transmitting the message to an electronic device other than the wireless communications device at a location identified by the physical location information.

* * * * *

UNITED STATES PATENT AND TRADEMARK OFFICE
CERTIFICATE OF CORRECTION

PATENT NO. : 7,471,946 B2 Page 1 of 1
APPLICATION NO. : 10/606675
DATED : December 30, 2008
INVENTOR(S) : Adamczyk et al.

It is certified that error appears in the above-identified patent and that said Letters Patent is hereby corrected as shown below:

In the Claims,
Column 11, Claim 19, Line 17: Please correct "xvith" to read -- with --

Signed and Sealed this

Twenty-third Day of June, 2009

JOHN DOLL
*Acting Director of the United States Patent and Trademark Office*